United States Patent
Chiang et al.

(10) Patent No.: US 7,937,168 B2
(45) Date of Patent: May 3, 2011

(54) AUTOMATED ABNORMAL MACHINE TRACKING AND NOTIFYING SYSTEM AND METHOD

(75) Inventors: Tai-Chuan Chiang, Hsinchu (TW); Chan-Pai Liu, Hsinchu County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 710 days.

(21) Appl. No.: 11/967,278

(22) Filed: Dec. 31, 2007

(65) Prior Publication Data

US 2009/0171481 A1 Jul. 2, 2009

(51) Int. Cl.
*G06F 19/00* (2011.01)
*G06F 11/30* (2006.01)
*G05B 9/02* (2006.01)

(52) U.S. Cl. ............ 700/80; 700/108; 702/183
(58) Field of Classification Search .......... 702/81, 702/84, 183; 700/78, 80, 108, 79
See application file for complete search history.

(56) References Cited

U.S. PATENT DOCUMENTS

| 5,761,064 A | 6/1998 | La et al. |
| 6,766,210 B2 * | 7/2004 | Jun et al. .................. 700/110 |
| 7,346,412 B2 * | 3/2008 | Tokorozuki et al. ........ 700/110 |
| 2008/0052042 A1 * | 2/2008 | McLain et al. .............. 702/185 |

FOREIGN PATENT DOCUMENTS

TW 584894 4/2004

* cited by examiner

*Primary Examiner* — Sean P Shechtman
(74) *Attorney, Agent, or Firm* — Winston Hsu; Scott Margo (57) ABSTRACT

An automated abnormal machine tracking and notifying method includes automatically collecting and analyzing a plurality of test results to obtain a plurality of abnormal information, storing the abnormal information in a machine status database, respectively counting an integral value of each abnormal information of at least a related potentially abnormal machine, judging whether a sum of the integral values of each potentially abnormal machine is greater than n, and automatically notifying at least a user of the potentially abnormal machine and the abnormal information by an automatic notification subsystem when the sum of the integral values is greater than n.

21 Claims, 3 Drawing Sheets

AUTOMATED ABNORMAL MACHINE TRACKING AND NOTIFYING SYSTEM AND METHOD

BACKGROUND OF THE INVENTION

1. Field of the Invention

The invention relates to an automated abnormal machine tracking and notifying system and method, and more particularly, to an automated abnormal machine tracking and notifying system and method capable of analyzing and immediately issuing notifications regarding different abnormal information.

2. Description of the Prior Art

In industries nowadays, particularly in the semiconductor or liquid crystal display (LCD) industries, manufacturing processes are considerably numerous and complicated. One product needs to undergo tens, or even hundreds processes in different manufacturing machines, transferring machines, and storing machines, to be completed. And tests and parameter adjustment have to be performed during or between those processes before pilot production or mass production, thus each specific production requirement is achieved, and qualities of the products can be consequently controlled and assured.

Conventionally, tasks in quality management department of the production line are to perform tests on products from each specific process. Then, engineers will sequentially analyze the statistical process control (SPC) chart or the wafer acceptance test (WAT) related to the out of control (OOC) lot or the hold lot to find out the correlation between the abnormal product and the abnormal machine, thus to diagnose the abnormal machine or abnormal machine in potency. However, the above-mentioned courses, in which the specific products or processes serving as main test objects, often ignore minor defects resulted from the potentially abnormal machine. Therefore, the abnormal machine or the potentially abnormal machine may not be duly reported before the next lot is entered, and thus causes loss in yields and costs.

Furthermore, it is well-known that there are different manufacturing and test apparatus/machines applied to the production line and operated by different users, who perform the quality management work in shifts. Although documents or electric systems are conventionally used in shift exchange, abnormal information sometimes is left out or ignored due to different judgment standards. And when the ignored small event or single event magnifies or induces a serious abnormal situation, loss is unavoidably caused in yields and costs.

Therefore, an automated abnormal machine tracking and notifying system and method capable of automatically tracking and analyzing different abnormal information from different processes and machines through different shifts, thus to automatically notify the users of the abnormal machine or potentially abnormal machine and improve stability of the manufacturing procedure is needed.

SUMMARY OF THE INVENTION

It is therefore a primary objective of the claimed invention to provide an automated abnormal machine tracking and notifying system and method to track, integrate, analyze, and conclude correlation between the abnormal product and the abnormal machine.

According to the claimed invention, an automated abnormal machine tracking and notifying system is provided. The system comprises a data collecting and analyzing subsystem used to collect a plurality of test results to obtain a plurality of abnormal information automatically, a machine status database used to store the abnormal information, an abnormal information counting device used to respectively count an integral value of each abnormal information of at least a related potentially abnormal machine, a judging device used to judging whether a sum of the integral values of the potentially abnormal machine is greater than n or not. When the sum of the integral values is greater than n, the judging device decides to notify a user of the potentially abnormal machine and the abnormal information. And the automated abnormal machine tracking and notifying system also comprises an automatic notification subsystem used to notify the user of the potentially abnormal machine and the abnormal information.

According to the claimed invention, an automated abnormal machine tracking and notifying method is provided. The method comprises steps of automatically collecting and analyzing a plurality of test results to obtain a plurality of abnormal information by a data collecting and analyzing subsystem, storing the abnormal information in a machine status database, respectively counting an integral value of each abnormal information of at least a related potentially abnormal machine by an abnormal information counting device, judging whether a sum of the integral values of each potentially abnormal machine is greater than n or not by a judging device, and automatically notifying at least a user of the potentially abnormal machine and the abnormal information by an automatic notification subsystem when the sum of the integral values is greater than n.

According to the automated abnormal machine tracking and notifying system and method, the abnormal information is obtained by automatically collecting and analyzing on-line, off-line test results, or information provided from the user by the data collecting and analyzing subsystem and is stored in the machine status database. When the sum of the integral values of each potentially abnormal information is greater than n, the user will be notified about the potentially abnormal machine and the abnormal information. Therefore the automated abnormal machine tracking and notifying system and method provided by the present invention is able to automatically track and analyze correlation between the abnormal information and the abnormal machine, thus to diagnose a related abnormal machine or a abnormal machine in potency, and duly notify the user of the potentially abnormal machine and the related abnormal information. Since each step of the abovementioned method is automatically performed by the automated abnormal machine tracking and notifying system, conventionally manual operation, analysis, and influence is avoided. And the method is also able to be a supplement for the inexperienced users. Generally, the automated abnormal machine tracking and notifying system and method provided by the present invention is capable of providing a complete correlation between the abnormal information and the abnormal machines through different shifts, processes, and machines.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
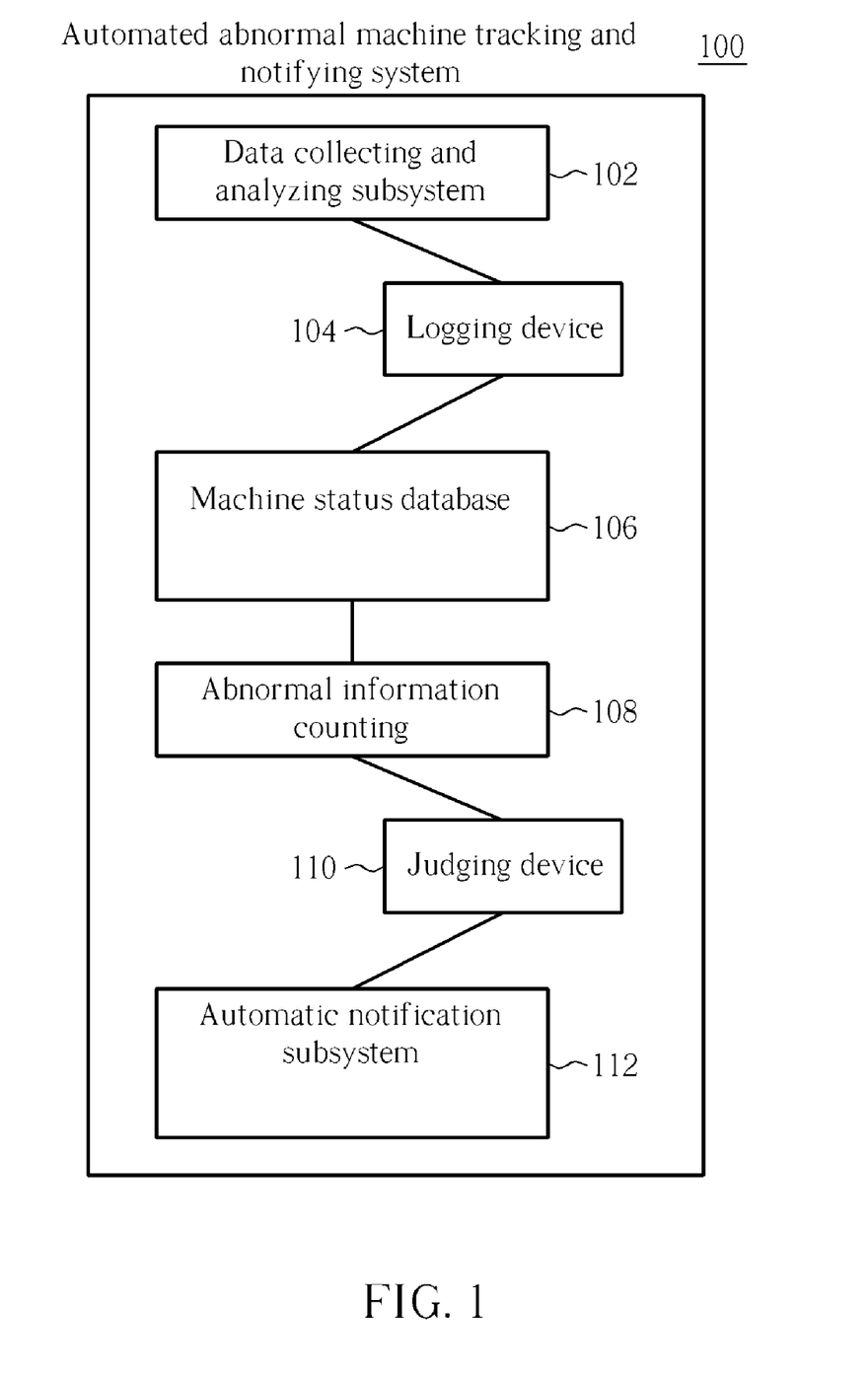
FIG. 1 is a drawing illustrating a preferred embodiment of the automated abnormal machine tracking and notifying system provided by the present invention.

Please refer to FIG. 1, which is a drawing illustrating a preferred embodiment of the automated abnormal machine tracking and notifying system provided by the present invention. As shown in FIG. 1, the automated abnormal machine tracking and notifying system 100 comprises a data collecting and analyzing subsystem 102, a logging device 104, a machine status database 106, an abnormal information counting device 108, a judging device 110, and an automatic notification subsystem 112. The data collecting and analyzing subsystem 102 is used to automatically collect a plurality of test results, for example, on-line process data, off-line process data, machine monitor data, product defect data, or information provided by users such as comment concerning maintenance time point, component replacement, or test review. The data collecting and analyzing subsystem 102 is also used to analyze or integrate the test results to obtain a plurality of abnormal information. The abnormal information is logged and stored in the machine status database 106 automatically by the logging device 104. The abnormal information stored in the machine status database 106 comprises at least a date, lot number, defect type, defect extent, related potentially abnormal machine, and an integral value of the potentially abnormal machine. In addition, the data collecting and analyzing subsystem 102 is also used to analyze the abnormal information to diagnose at least a related abnormal machine or an abnormal machine in potency. And the diagnosed abnormal machine and its abnormal information is automatically logged in the machine status database 106 by the logging device 104. The logging device 104 further is used to manually log the abnormal information or other new abnormal information not from the data collecting and analyzing subsystem 102 in the machine status database 106.

The abnormal information counting device 108 is used to respectively count an integral value of each abnormal information of the related potentially abnormal machine while the judging device 110 is used to judge whether a sum of the integral values of each potentially abnormal machine is greater than n or not. When the sum of the integral values is greater than n, which is exemplarily equal to or greater than 2, the judging device 110 decides to notify a user about the potentially abnormal machine and the abnormal information. It is noteworthy that the judging device 110 is used to judge whether the sum of the integral values is greater than n or not in a predetermined period. N can be defined by the users adjustably according to industry, process complexity, machine type, machine throughput, machine idle time, or preventive maintenance (PM) cycle. Then, the automatic notification subsystem 112 comprising at least alarm on computer integrated manufacture (CIM) system, cell phone message, alarm message on machine interface, or end user computer screen is used to notify the user of the potentially abnormal machine and the abnormal information.

Figure 2:
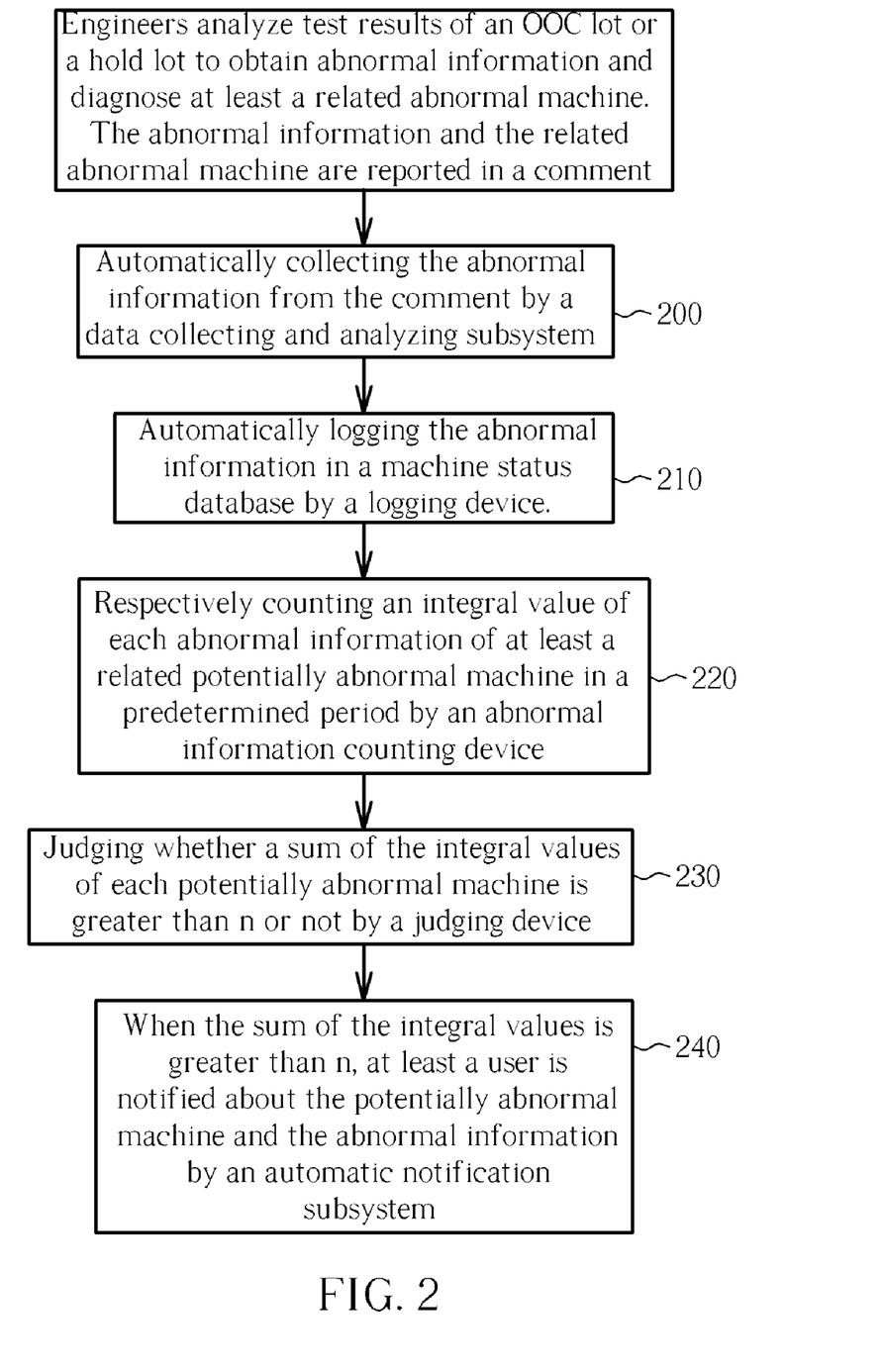
FIG. 2 is a first flow chart illustrating the automated abnormal machine tracking and notifying method of the present invention.

Please refer to FIGS. 1 and 2, wherein FIG. 2 is a first flow chart illustrating the automated abnormal machine tracking and notifying method of the present invention. Conventionally, users such as in-line process engineers or quality assurance engineers will perform tests, such as process qualification and related test, product qualification and related test, process evaluation and related test, process monitor and related test, routine product monitor and related test, in-line process evaluation & monitor and related test, on different products from each process. Thus a great number of in-line process data, off-line process data, machine monitor data, or product defect data is obtained. The in-line process engineer or quality assurance engineer will determine if a particular lot is abnormal or not according to the above-mentioned data. As shown in FIG. 2, when the lot is deemed a scrap lot, an out of control (OOC) lot, or a hold lot, its related SPC chart or WAT data will be particularly analyzed by the engineer to obtain test results. The test results are used to find out a correlation between the abnormal product and the abnormal machine, thus an abnormal information is concluded and an abnormal machine or abnormal machine in potency is diagnosed. Thereafter, the abnormal information or the test results will be reported in a comment from the engineer. Next, as shown in FIG. 2, steps of the automated abnormal machine tracking and notifying method are performed:

Step 200: Automatically collecting the abnormal information from information provided by the engineer such as the comment by the data collecting and analyzing subsystem 102 of the automated abnormal machine tracking and notifying 100. Further, the data collecting and analyzing subsystem 102 can automatically collect the test results and analyze the test results to obtain the abnormal information.

Step 210: Following Step 200, the abnormal information is automatically logged in the machine status database 106 by the logging device 104. It is noteworthy that the abnormal information can be manually logged in the machine status database 106 through the logging device 104. In addition, when a new machine enters the manufacturing process, abnormal information related to the new machine can be manually logged in the machine status database 106 through the logging device 104. The abnormal information stored in the machine status database 106 comprises at least a date, lot number, defect type, defect extent, related potentially abnormal machine, and an integral value of the potentially abnormal machine.

Step 220: Following Step 210. Respectively counting the integral value of each abnormal information of the potentially abnormal machine by the abnormal information counting device 108. Since each machine possesses different throughputs, machine idle times, and preventive maintenance (PM) cycles, the integral values of the abnormal information are counted in a predetermined period, and the integral values beyond the predetermined period can be omitted or not counted. However, the abnormal information is still stored in the machine status database 106 to be reference for diagnosing abnormal machines.

Step 230: Following Step 220. The judging device 110 is used to judging whether a sum of the integral values of the abnormal information of each potentially abnormal machine is greater than n or not.

Step 240: Following Step 230. When the sum of the integral values is greater than n in the predetermined period, the judging device 110 decides to notify a user about the potentially abnormal machine and the related abnormal information through the automatic notification subsystem 112. On the contrary, when the sum of the integral values is smaller than n, or remaining smaller than n even beyond the predetermined period, the integral values will not be counted in the next predetermined period, but the abnormal information is still stored in the machine status database 106 to be reference for diagnosing abnormal machines until the users determine that the abnormal information and the integral values can be deleted from the machine status database 106.

Hereinafter is a first preferred embodiment according to the above described first flow chart. When a First Lot, which completes a formation process for poly 1 layer in a first machine, is deemed an OOC lot or a hold lot, the First Lot is hold to be reviewed by at least an engineer. After being reviewed and analyzed by the engineer, the First Lot is found to have defocus defect and dropped particle defect. If the defects are too serious, the First Lot will be deemed a scrap lot, and the first machine will be immediately calibrated. If the scrap standard is not achieved, the First Lot will be released for following processes with a comment reported by the engineer. For example, the engineer may note: 1 die suffers defocus and the other suffers dropped particle with 50% in extent.

As mentioned in Step 200, the data collecting and analyzing subsystem 102 of the automated abnormal machine tracking system 100 is used to automatically collect the abnormal information from the comment provided by the engineer immediately after each process, thus abnormal information is made up as shown in Table 1:

TABLE 1

| Date | Lot | Defect type | Suffer | Extent (%) | Killer/ Non-killer Defect | Machine | Integral value of the machine | Level | Integral value of the level |
|---|---|---|---|---|---|---|---|---|---|
| | 1 | Defocus | 1 | N/a | Killer | 1 | 1 | Poly 1 photo | 1 |
| | 1 | dropped | N/a | 50 | Non-killer | 1 | 1 | Poly 1 photo | 1 |

Please note that "N/a" will be shown in Table 1 automatically by the data collecting and analyzing subsystem 102 if the related information is not provided by the engineer. And the first machine will be shown in Table 1 by the data collecting and analyzing subsystem 102 though the engineer does not particularly point out in the comment because the data collecting and analyzing subsystem 102 always automatically tracks the machine in which the lot just undergoes a particular process. Furthermore, the defect types can be previously classified into "killer defect" or "non-killer defect" and set in the machine status database 106 by the users according to processes and machines, therefore the defect types collected from the comment will be automatically recorded as "killer defect" or "non-killer defect" according to rules already set in the machine status database 106.

Next, as described in Step 210, the abnormal information as shown in Table 1 is automatically logged in the machine status database 106 by the logging device 104, followed by respectively granting an integral value to each abnormal information and the related potentially abnormal machine by the abnormal information counting device 108. Then the abnormal information counting device 108 respectively counts the integral value of each abnormal information, as described in Step 220.

As described in the Step 220 and Step 230, the integral values will be counted in a predetermined period. For example, if a sum of the integral values of the potentially abnormal machine is greater than n in two days, the potentially abnormal machine and the related abnormal information will be deemed to be notified by the judging device 110. As mentioned above, n is adjustable according to different requirements. In the first preferred embodiment, n is equal to 2. The predetermined period, which is exemplarily two days in the first preferred embodiment, is adjustable according to throughputs, machine idle times, and PM cycles of different machines or process. In the first preferred embodiment, two types of defects have been found in the first machine and the sum of the integral values is equal to 2, therefore a user will be notified about the potentially abnormal first machine and the related abnormal information by the automatic notification subsystem 112, as described in Step 240. If the sum of integral values is smaller than 2 or remaining smaller than 2 even beyond the two days, the abnormal information will be deemed a single event, and will not be counted in the next predetermined period. However, the abnormal information is still stored in the machine status database 106 to be the reference for diagnosing abnormal machine until the users determine to delete the abnormal information from the machine status database 106. In another methodology, the integral values of the abnormal information can be zeroed when beyond the predetermined period in order to avoid meddling in the afterwards abnormal information counting. In the same concept, the abnormal information is still stored in the machine status database 106 to be the reference for diagnosing abnormal machine.

According to the first preferred embodiment, different defect types occurring in one machine, which occur in different shifts or recorded by different engineers, will be automatically tracked and counted by the automated abnormal machine tracking and notifying system 100. Thus the potentially abnormal machine and the related abnormal information can be automatically tracked and properly notified. Accordingly omission or errors caused in manual shift exchange or due to inexperienced users, and problems caused by ignoring small event can be avoided.

Hereinafter is a second preferred embodiment according to the above described first flow chart. When a Second Lot, which completes a formation process for poly 1 layer, is deemed an OOC lot or a hold lot, the Second Lot is to be reviewed and analyzed by the engineer, and defocus defect and dropped particle defect are found in the Second Lot. However, the scrap standard is not achieved, therefore the Second Lot will be released for following processes with a first comment reported by the engineer. For example, the engineer may note: 1 die suffers defocus.

The Second Lot then undergoes next process, for example, a metal 1 layer formation process performed in the first machine. However, defocus defect and metal grain defect are still found by the same or other engineer after the process. Since the scrap standard is not achieved, the Second Lot is released for following processes with a second comment provided by the engineer. For example, the engineer may note: 1 die suffers defocus and metal grain false count.

As mentioned in Step 200, the data collecting and analyzing subsystem 102 of the automated abnormal machine tracking system 100 is used to automatically collect the abnormal information from the first and second comments after each process. Thus abnormal information is made up as shown in Table 2:

TABLE 2

| Date | lot | defect type | suffer | Extent (%) | Killer/Non-killer defect | machine | integral value of the machine | level | integral value of the level |
|---|---|---|---|---|---|---|---|---|---|
| | 2 | Defocus | 1 | N/a | Killer | 1 | 1 | Poly 1 photo | 1 |
| | 2 | Metal grain | N/a | N/a | non-killer | 1 | 1 | Metal 1 photo | 1 |
| | 2 | defocus | 1 | N/a | Killer | 1 | 1 | Metal 1 photo | 1 |

Next, as described in Step 210, the abnormal information as shown in Table 2 is automatically logged and stored in the machine status database 106 by the logging device 104, followed by respectively granting an integral value to each abnormal information by the abnormal information counting device 108. As shown in Table 2, the integral values are respectively granted to the three abnormal information. Then the abnormal information counting device 108 respectively counts the integral value of each abnormal information, as described in Step 220.

As described in Step 220 and Step 230, the integral values will be counted in a predetermined period. For example, if a sum of the integral values is greater than n in two days, the abnormal information will be deem to be notified. As mentioned above, n is adjustable according to different requirements. In the second preferred embodiment, n is equal to 2. The predetermined period, which is exemplarily two days in the second embodiment, is adjustable according to throughputs, machine idle times, and PM cycles of different machines or process. In the second preferred embodiment, two types of defects have been found in the first machine and the sum of the integral values is greater than 2, therefore a user will be notified about the potentially abnormal first machine and the related abnormal information by the automatic notification subsystem 112 as described in Step 240. As mentioned above, if the sum of integral values is smaller than 2 or remaining smaller than 2 even beyond the two days, the abnormal information will be deemed a single event, and will not be counted in the next predetermined period. However, the abnormal information is still stored in the machine status database 106 to be the reference for diagnosing abnormal machine until the users determine to delete.

In the second embodiment, the non-killer defects are counted, however, it is flexible to count the non-killer defect or not according to tolerance of different processes and products. In another methodology, the integral values of the non-killer defect are counted after weighed to avoid unnecessary cost caused by improper exaggerating the influence of the non-killer defect toward the specific machine, and to avoid improper ignoring the influence of the non-killer defect toward the specific machine.

It is noteworthy that the automated abnormal machine tracking and notifying system 100 and method always automatically collects different information provided by the users or test results from different processes, though the defects occur in different processes, different layers, different time points, and recorded by different engineers, therefore it can track and analyze to find out at least an abnormal machine. Thus the abnormal information and the related abnormal machine can be duly notified, and omission or errors caused in manual shift exchange or due to inexperienced users can be avoided.

Figure 3:
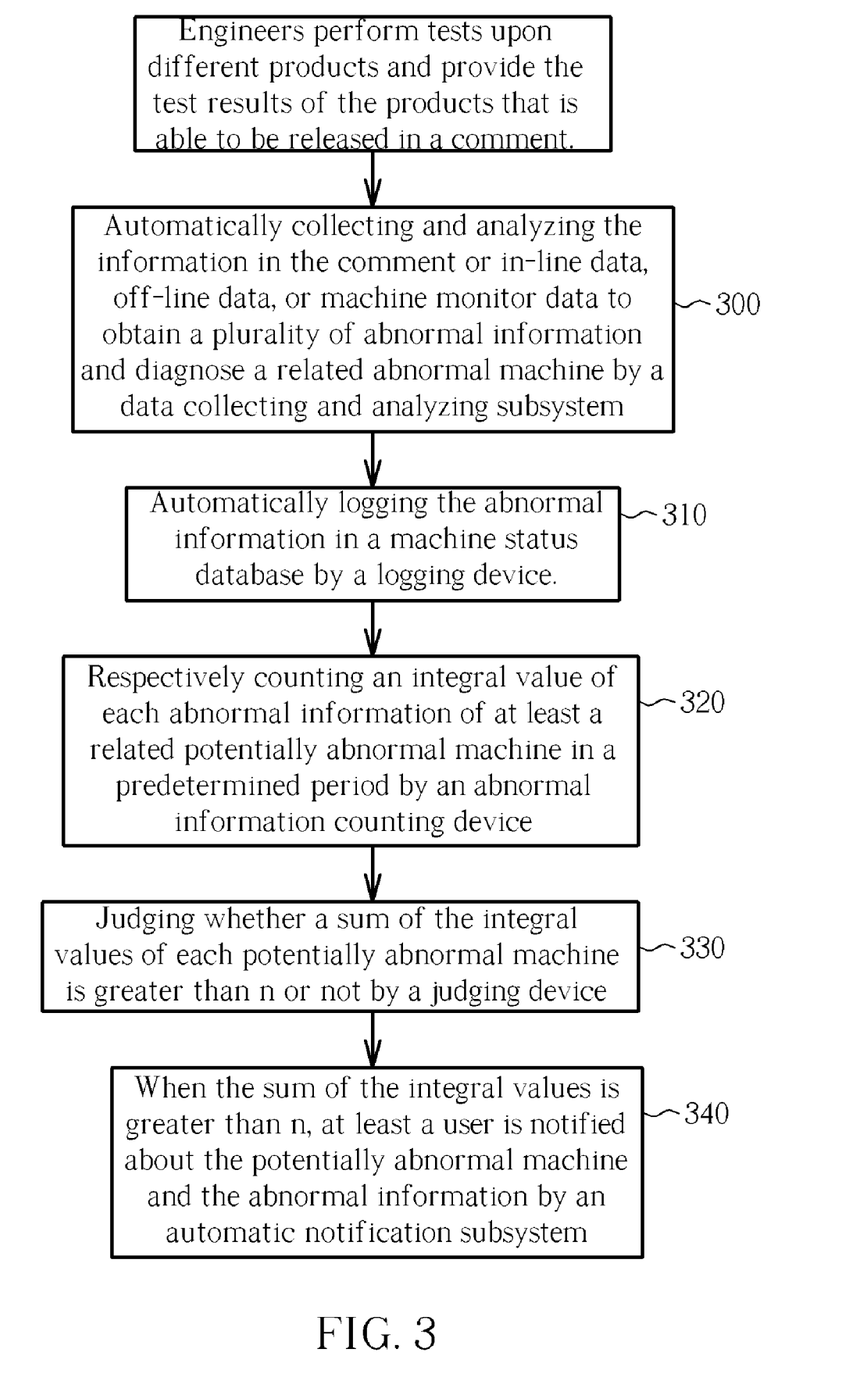
FIG. 3 is a second flow chart illustrating the automated abnormal machine tracking and notifying method of the present invention.

Please refer to FIGS. 1 and 3, wherein FIG. 3 is a second flow chart illustrating the automated abnormal machine tracking and notifying method of the present invention. As mentioned above, users such as in-line process engineer or quality assurance engineer will perform tests on different products from each process to obtain a great number of data. And after analyzing the above-mentioned data, test results are obtained, and the user will determine if a particular lot can be released according to the test results. Thereafter, as shown in FIG. 3, steps of the automated abnormal machine tracking and notifying method are performed:

Step 300: Automatically collecting the information provided by the engineer such as the comment by the data collecting and analyzing subsystem 102 of the automated abnormal machine tracking and notifying 100. In another methodology, the data collecting and analyzing subsystem 102 automatically collects the test results or the in-line process data, the off-line process data, the machine monitor data, or product defect data. Then the data collecting and analyzing subsystem 102 will analyze the test results or the abovementioned data to obtain abnormal information and diagnose at least a related potentially abnormal machine.

Step 310: Following Step 300, the abnormal information is automatically logged and stored in the machine status database 106 by the logging device 104. As mentioned above, the abnormal information can be manually logged in the machine status database 106 through the logging device 104. In addition, when a new machine enters the manufacturing process, abnormal information related to the new machine can be manually logged in the machine status database 106 through the logging device 104. The abnormal information stored in the machine status database 106 comprises at least a date, lot number, defect type, defect extent, related potentially abnormal machine, and an integral value of the potentially abnormal machine.

Step 320: Following Step 310. Respectively counting the integral value of each abnormal information of the related potentially abnormal machine in a predetermined period by the abnormal information counting device 108.

It is noteworthy that since each machine possesses different throughputs, machine idle times, and PM cycles, the integral values of the abnormal information are counted in the predetermined period, and the integral values beyond the predetermined period can be omitted or not counted. However, the abnormal information is still stored in the machine status database 106 to be reference for diagnosing abnormal machines.

Step 330: Following Step 320. The judging device 110 judges whether a sum of the integral values of each potentially abnormal machine is greater than n or not.

Step 340: Following Step 330. When the sum of the integral values is greater than n in the predetermined period, at least a user will be notified about the abnormal machine and the related abnormal information by an automatic notification subsystem 112. On the contrary, when the sum of the integral values is smaller than n, or remaining smaller than n even beyond the predetermined period, the integral values will not be counted in the next predetermined period, but the abnormal information is still stored in the machine status database 106 to be reference for diagnosing abnormal machines until the users determine that the abnormal information can be deleted from the machine status database 106.

Hereinafter is a third preferred embodiment according to the above described second flow chart. When a Third Lot, which completes a formation process for poly 1 layer in a first machine, is deemed an OOC lot or a hold lot, the Third Lot is to be reviewed by the engineer. After being reviewed and analyzed by the engineer, the Third Lot is found to have defocus defect and dropped particle defect. However the scrap standard is not achieved, therefore the Third Lot will be released for following processes with a first comment reported by the engineer. For example, the engineer may note: 1 die suffers defocus.

As mentioned in Step 300, the data collecting and analyzing subsystem 102 of the automated abnormal machine tracking system 100 is used to automatically collect the abnormal information from the comment provided by the engineer or directly collect the in-line data, off-line data, machine monitor data, or product defect data related to the Third Lot immediately after each process, thus abnormal information is made up as shown in Table 3. The abnormal information shown in Table 3 is automatically analyzed by the data collecting and analyzing subsystem 102, thus a related abnormal machine or an abnormal machine in potency can be diagnosed. In the third preferred embodiment, the user does not recognize which machine is related to the abnormal information, however, the data collecting and analyzing subsystem 102, being provided with great amount of abnormal information stored in the machine status database 102 as diagnosis reference, is able to analyze the abnormal information to recognize that the defect occurring in the Third Lot is caused by the first machine. Thus the first machine is automatically diagnosed and shown in Table 3:

TABLE 3

| Date | lot | defect type | suffer | Extent (%) | Killer/ Non-killer defect | machine | integral value of the machine level | integral value of the level |
|------|-----|-------------|--------|------------|---------------------------|---------|-------------------------------------|-----------------------------|
|      | 3   | Defocus     | 1      | N/a        | Killer                    | 1*      | 1 Poly 1 photo                      | 1                           |
|      | 3   | dropped     | N/a    | 50         | Non-killer                | 1*      | 1 Poly 1 photo                      | 1                           |

Next, as described in Step 310, the abnormal information as shown in Table 3 is automatically logged and stored in the machine status database 106 by the logging device 104, followed by respectively granting an integral value to each abnormal information by the abnormal information counting device 108, as shown in Table 3. Then the abnormal information counting device 108 respectively counts the integral values of each abnormal information, as described in Step 320.

Next, as described in the Steps 320 and 330, the integral values will be counted in a predetermined period. For example, if a sum of the integral values is greater than n in two days, the abnormal information will be deemed to be notified by the judging device 108. As mentioned above, n is adjustable according to different requirements. In the third preferred embodiment, n is equal to 2. The predetermined period, which is exemplarily two days in the third embodiment, is adjustable according to throughputs, machine idle times, and PM cycles of different machines or process. In the third preferred embodiment, two defect types have found in the first machine within two days, and the sum of the integral values is greater than 2, therefore a user will be notified about the potentially abnormal first machine and the related abnormal information by the automatic notification subsystem 112, as described in Step 340. As mentioned above, if the sum of integral values is smaller than 2 or remaining smaller than 2 even beyond the two days, the abnormal information will be deemed a single event, and will not be counted in the next predetermined period. However, the abnormal information is still stored in the machine status database 106 to be the reference for diagnosing abnormal machine until the users determine to delete it from the machine status database 106.

In the third preferred embodiment, the great amounts of abnormal information stored in the machine status database 106 serve as diagnosis reference, therefore at least a related potentially abnormal machine can be automatically analyzed and diagnosed by the automated abnormal machine tracking and notifying system 100.

Hereinafter is a fourth preferred embodiment according to the above described second flow chart. When a Fourth Lot, which completes a formation process for poly 1 layer in a first machine, is deemed an OOC lot or a hold lot, the Fourth Lot is to be reviewed and analyzed by the engineer, and defocus defect is found in the Fourth Lot. However, the scrap standard is not achieved, therefore the Fourth Lot is released for following processes with a first comment provided by the engineer. For example, the engineer may note: 1 die suffers defocus defect.

Then a Fifth Lot, which completes a formation process for metal 1 layer in the first machine, is also deemed OOC lot or a hold lot with defocus defect and metal grain defect found by the same or other engineer after the process. Since the scrap standard is not achieved, the Fifth Lot is released for following processes with a second comment provided the engineer. For example, the engineer may note: 1 die suffers defocus defect, and metal grain false count.

Then a Sixth Lot, which completes a formation process for poly 1 layer in a second machine, is also deemed OOC lot or a hold lot with defocus defect found by the same or other engineer after the process. Since the scrap standard is not achieved, the Sixth Lot is released for following processes with a third comment reported by the engineer. For example, the engineer may note: 1 die suffers defocus.

As mentioned in Step 300, the data collecting and analyzing subsystem 102 of the automated abnormal machine tracking system 100 is used to automatically collect the abnormal information from the comment provided by the engineer immediately after each process, thus abnormal information obtained from the first, the second, and the third comments are made up as shown in Table 4:

TABLE 4

| Date | lot | defect type | suffer | Extent (%) | Killer/ Non-killer defect | machine | integral value of the machine | level | integral value of the level |
|---|---|---|---|---|---|---|---|---|---|
| | 4 | Defocus | 1 | N/a | Killer | 1 | 1 | Poly 1 photo | 1 |
| | 5 | Defocus | 1 | N/a | killer | 1 | 1 | Metal 1 photo | 1 |
| | 5 | Metal grain | N/a | N/a | Non-killer | 1 | 1 | Metal 1 photo | 1 |
| | 6 | Defocus | 1 | N/a | Killer | 2 | 1 | Poly 1 photo | 1 |

Next, as described in Step 310, the abnormal information as shown in Table 4 is automatically logged and stored in the machine status database 106 by the logging device 104, followed by respectively granting an integral value to each abnormal information by the abnormal information counting device 108, as shown in Table 4. Then the abnormal information counting device 108 counts the integral value of each abnormal information in a predetermined period, as described in Step 320.

As described in the Step 320 and Step 330, the integral values will be counted in a predetermined period. For example, if a sum of the integral values is equal to or greater than n in two days, the abnormal information will be deemed to be notified by the judging device 108. As mentioned above, n is adjustable according to different requirements. In the fourth preferred embodiment, n is equal to 2. The predetermined period, which is exemplarily two days in the fourth embodiment, is adjustable according to throughputs, machine idle times, and PM cycles of different machines or process. In the fourth preferred embodiment, two defect types have found in the first machine within two days, and the sum of the integral values is greater than 2, therefore at least a user will be notified about the potentially abnormal first machine and the related abnormal information by the automatic notification subsystem 112, as described in Step 340. If the sum of integral values is smaller than 2 or remaining smaller than 2 even beyond the two days, the abnormal information will be deemed a single event, and will not be counted in the next predetermined period. However, the abnormal information is still stored in the machine status database 106 to be the reference for diagnosing abnormal machine until the users determine to delete it from the machine status database 106.

In the fourth preferred embodiment, automated abnormal machine tracking and notifying system 100 notifies the user about the abnormal information of the first machine because the sum of the integral values is greater than 2. In other words, though the defects occur in different processes, different layers, different lots and found by different engineers, the abnormal information still can be tracked, and the related abnormal machine still can be recognized and diagnosed by the automated abnormal machine tracking and notifying system 100 and method.

Furthermore, it is noteworthy that in the fourth embodiment, the defocus defects occurring in the Fourth Lot and the Sixth Lot are recognized to be the abnormal information respectively belonged to the first machine and the second machine by the engineers, and shown in Table 4. However, it is noticeable that these two defocus defects in the two Lots are both occurring in the poly 1 layer, therefore the automated abnormal machine tracking and notifying system 100 will automatically compare two manufacturing processes performed to the two Lots. If it is found that both of the two Lots have passed a third machine, the automated abnormal machine tracking and notifying system 100 will further point out the third machine and notify the users of the abnormal information. If a sum of the integral values of the third machine is equal to or greater than n, the automated abnormal machine tracking and notifying system 100 will immediately notify the users of the abnormal information and the related third machine by the automatic notification subsystem 112.

In the fourth embodiment, the automated abnormal machine tracking and notifying system 100 and method are able to go over different lots, different processes, and different shifts to track and analyze the abnormal information. Furthermore, if an identical defect type is found right after two different machines, the automated abnormal machine tracking and notifying system 100 provided by the present invention is able to automatically recognize and diagnose at least an additional related potentially abnormal machine, and notify the user of the additional potentially abnormal machine.

Hereinafter is a fifth preferred embodiment according to the above described second flow chart. When a Seventh Lot is deemed an OOC lot or a hold lot because defect such as defocus defect is found after completing formation of a poly 1 layer, the data collecting and analyzing subsystem 102 of the automated abnormal machine tracking system 100 automatically collects the abnormal information from the comment provided by the engineer or related data immediately, thus abnormal information is made up and potentially abnormal machines are recognized as shown in Table 5. For example, the defocus defect is correlated with exposure abnormality of a first machine and also correlated with drop particle caused in a second machine. Therefore, the first and second machines are recognized and recorded in Table 5.

Then an Eighth Lot, a Ninth Lot, a Tenth Lot, and an Eleventh Lot which respectively complete formation processes for poly 1 layer in different exposure machines, are also found defocus defect. The data collecting and analyzing subsystem 102 will recognize a third machine, a fourth machine, a fifth machine, and a sixth machine as potentially abnormal machines in which the Lots respectively undergo the exposure processes according to the data or abnormal information from the comment provided by the engineer. Furthermore, the data collecting and analyzing subsystem 102, which automatically compares whole processes of each Lot, finds all of the Lots have passed the second machine, therefore the second machine is further recognized and recorded in Table 5:

TABLE 5

| Date | lot | defect type | suffer | Extent (%) | Killer/Non-killer defect | machine | integral value of the machine level | | integral value of the level |
|---|---|---|---|---|---|---|---|---|---|
| | 7 | Defocus | 1 | N/a | Killer | 1 | 1 | Poly 1 photo | 1 |
| | 7 | Defocus | 1 | N/a | killer | 2 | 1 | Poly 1 photo | 1 |
| | 8 | Defocus | 1 | N/a | killer | 2 | 1 | poly 1 photo | 1 |
| | 8 | Defocus | 1 | N/a | Killer | 3 | 1 | Poly 1 photo | 1 |
| | 9 | Defocus | 1 | N/a | killer | 2 | 1 | Poly 1 photo | 1 |
| | 9 | Defocus | 1 | N/a | Killer | 4 | 1 | Poly 1 photo | 1 |
| | 10 | Defocus | 1 | N/a | killer | 2 | 1 | Poly 1 photo | 1 |
| | 10 | Defocus | 1 | N/a | Killer | 5 | 1 | Poly 1 photo | 1 |
| | 11 | Defocus | 1 | N/a | killer | 2 | 1 | Poly 1 photo | 1 |
| | 11 | Defocus | 1 | N/a | Killer | 6 | 1 | Poly 1 photo | 1 |

Next, as described in Step 310, the abnormal information as shown in Table 5 is automatically logged and stored in the machine status database 106 by the logging device 104, followed by respectively granting an integral value to each abnormal information by the abnormal information counting device 108, as shown in Table 5. Then the abnormal information counting device 108 counts the integral values of each abnormal information in a predetermined period, as described in Step 320.

As described in the Step 320 and Step 330, the integral values of each potentially abnormal machine will be counted in a predetermined period. For example, if a sum of the integral values is equal to or greater than n in two days, the abnormal information will be deemed to be notified by the judging device 108. As mentioned above, n is adjustable according to different requirements. It is noteworthy that, in the fifth preferred embodiment, the potentially abnormal second machine is recognized by the system provided by the present invention, therefore n is set to be equal to 4 to avoid unnecessary cost caused by improper exaggerating abnormal information tracked by the system. As shown in Table 5, the sum of the integral values of the second machine is equal to 4, therefore at least a user will be notified of the potentially abnormal second machine and the related abnormal information. Since the sums of the integral values of other machines are all equal to 1, those abnormal information are deemed single events.

It is well known the each defect type may be caused by various abnormal machines, that is, each defect type is correlated with a plurality of machines, therefore defect types correlated with different types of machines have been defined in the machine status database 106. When the defect is found, every related potentially abnormal machine can be tracked by the automated abnormal machine tracking and notifying system 100. Consequently, as described in the fifth embodiment, same defects found in different Lots right after passing different exposure machines are analyzed and compared by the automated abnormal machine tracking and notifying system 100, thus another related potentially abnormal machine can be diagnosed. Though the defects occur right after passing different machines, in different lots, and found by different engineers, the abnormal information still can be tracked, and the related abnormal machine still can be recognized and diagnosed by the automated abnormal machine tracking and notifying system 100 and method.

According to the automated abnormal machine tracking and notifying system and method, the abnormal information is obtained by automatically collecting and analyzing on-line or off-line test results or information provided from the user by the data collecting and analyzing subsystem. When the sum of the integral values of each potentially abnormal information is greater than n, the user is notified about the potentially abnormal machine and the related abnormal information. Therefore the automated abnormal machine tracking and notifying system and method provided by the present invention is able to automatically track, integrate, and analyze correlation between the abnormal information and the abnormal machine, thus diagnose the related abnormal machine and duly notify the user of the abnormal information and the related potentially abnormal machine. Since each step of the abovementioned method is automatically performed by the automated abnormal machine tracking and notifying system, the conventionally manual operation, analysis, verification and influence is avoided. And the method is also able to be the supplement for inexperienced users and the training and education material for the new-employees.

Those skilled in the art will readily observe that numerous modifications and alterations of the device and method may be made while retaining the teachings of the invention.

What is claimed is:

1. An automated abnormal machine tracking and notifying system comprising:
    a data collecting and analyzing subsystem used to collect and analyze a plurality of test results to obtain a plurality of abnormal information automatically;
    a machine status database used to store the abnormal information;
    an abnormal information counting device used to respectively count an integral value of each abnormal information of at least a related potentially abnormal machine;
    a judging device used to judge whether a sum of the integral values of each abnormal information of each related potentially abnormal machine is greater than n or not, and when the sum of the integral values being greater than n, the judging device deciding to notify at least a user; wherein n is adjustable according to machine type, machine throughput, machine idle time, or preventive maintenance (PM) cycle; and an automatic notification subsystem used to notify the user of the potentially abnormal machine and the abnormal information.

2. The system of claim 1, wherein the test results are from on-line process data, off-line process data, machine monitor data, product defect data, or information provided by the user.

3. The system of claim 1, wherein the data collecting and analyzing subsystem is used to analyze the abnormal information to diagnose the related potentially abnormal machine.

4. The system of claim 1, further comprising a logging device.

5. The system of claim 4, wherein the logging device is used to manually log the abnormal information or other new abnormal information not from the data collecting and analyzing subsystem in the machine status database.

6. The system of claim 4, wherein the logging device automatically logs the abnormal information in the machine status database.

7. The system of claim 1, wherein the abnormal information stored in the machine status database comprises at least a date, lot number, defect type, defect extent, the related potentially abnormal machine, and the integral value of the potentially abnormal machine.

8. The system of claim 1, wherein n is equal to or greater than 2.

9. The system of claim 1, wherein the judging device is used to judge whether the sum of the integral values of each potentially abnormal information is greater than n or not in a predetermined period, and when the sum of the integral values is greater than n in the predetermined period, the judging device decides to notify the user about the potentially abnormal machine and the abnormal information.

10. The system of claim 9, wherein the predetermined period is adjustable according to machine type, machine throughput, machine idle time, or preventive maintenance (PM) cycle.

11. The system of claim 1, wherein the automatic notification subsystem comprises e-mail, alarm on computer integrated manufacture (CIM) system, cell phone message, alarm message on machine interface, or end user computer screen.

12. An automated abnormal machine tracking and notifying method, comprising steps of:
automatically collecting and analyzing a plurality of test results to obtain a plurality of abnormal information by a data collecting and analyzing subsystem;
storing the abnormal information in a machine status database;
respectively counting an integral value of each abnormal information of at least a related potentially abnormal machine by an abnormal information counting device;
judging whether a sum of the integral values of each abnormal information of each related potentially abnormal machine is greater than n or not by a judging device; wherein n is adjustable according to machine type, machine throughput, machine idle time, or preventive maintenance cycle; and
automatically notifying at least a user of the potentially abnormal machine and the abnormal information by an automatic notification subsystem when the sum of the integral values is greater than n.

13. The method of claim 12, wherein the test results are from on-line process data, off-line process data, machine monitor data, product defect data, or information provided by the user.

14. The method of claim 12, wherein the data collecting and analyzing subsystem is used to analyze the abnormal information to diagnose the related potentially abnormal machine.

15. The method of claim 12, further comprising a step of automatically logging the abnormal information in the machine status database by a logging device.

16. The method of claim 12, further comprising a step of manually logging the abnormal information or other new abnormal information not from the data collecting and analyzing subsystem in the machine status database.

17. The method of claim 12, wherein the abnormal information stored in the machine status database comprises at least a date, lot number, defect type, defect extent, the related potentially abnormal machine, and the integral value of the potentially abnormal machine.

18. The method of claim 12, wherein n is equal to or greater than 2.

19. The method of claim 12, further comprising a step of judging whether the sum of the integral values of each potentially abnormal information is greater than n in a predetermined period by the judging device, and when the sum of the integral values is greater than n in the predetermined period, the judging device decides to notify the user about the potentially abnormal machine and the abnormal information.

20. The method of claim 19, wherein the predetermined period is adjustable according to machine type, machine throughput, machine idle time, or preventive maintenance (PM) cycle.

21. The method of claim 12, wherein the automatic notification subsystem comprises e-mail, alarm on computer integrated manufacture (CIM) system, cell phone message, alarm message on machine interface, or end user computer screen.

* * * * *